Figure 1:
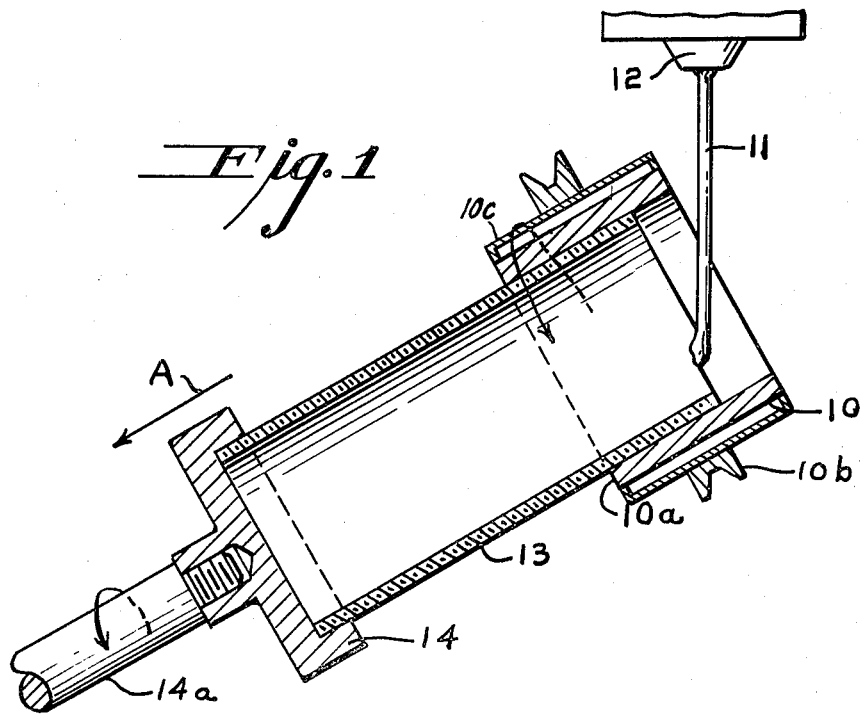

April 12, 1966 S. A. CORTRIGHT ETAL 3,245,770
CONTINUOUS CYLINDER SPINNING OF GLASS
Filed Oct. 30, 1961

INVENTORS,
STANLEY A. CORTRIGHT
AND THOMAS HOWITT JR.,
AND GEORGE C. SHAY
BY Clarence R. Patty, Jr.
ATTORNEY

3,245,770
CONTINUOUS CYLINDER SPINNING OF GLASS

Stanley A. Cortright, Thomas Howitt, Jr., and George C. Shay, all of Corning, N.Y., assignors to Corning Glass Works, Corning, N.Y., a corporation of New York
Filed Oct. 30, 1961, Ser. No. 148,399
4 Claims. (Cl. 65—71)

This invention relates to the continuous formation of cylindrical bodies and more particularly to continuously centrifugally forming siliceous or vitreous material.

The continuous manufacture of small diameter glass tubes or cane is known in the prior art. In such manufacture it has been customary to utilize a slowly rotating drum, having a low heat conductive refractory inner lining, which is heated to maintain the glass supplied thereto in a molten or plastic condition. The molten glass is usually lip fed to the lowermost inner surface of the upper end of the rotating drum, through an opening which may be of substantially the same interior diameter as the rotating drum. The glass passing through the rotating drum is then drawn out from the lower end in cylindrical form while in a plastic or molten condition and attenuated to the desired diameter.

Due to the relatively high viscosity of the glass normally used in the production of such continuous tubing, the heated refractory slowly rotating drum, known in the prior art, was sufficient to distribute the viscous lip-fed glass, delivered at a low rate of pull, about the inner surface of the rotating drum. A fairly uniform cylindrical shape was produced which, due to the fact that it was retrained in a plastic state, could be attenuated to form a small diameter tube of desired diameter. However, with the innovation of today's low viscosity glasses, many of which have short working ranges, the prior concept of slowly rotating a heated refractory drum, is completely inadequate for forming large diameter tubes of a magnitude of up to about four feet in diameter.

With the low viscosity glasses, it is necessary to stream feed the glass into the cylindrical forming device, in order to provide a practical rate of feed with adequate control. Further, in order to uniformly distribute such stream-fed low viscosity glass about the inner surface of the mold or forming device and provide for the solidification of a uniform glass cylinder therewithin, the forming device must be rotated at a relatively high rate of rotation sufficient to impart centrifugal force to the molten glass supplied thereto. In addition, the forming device or mold should be made of a relatively high heat conductive material to facilitate the solidification of the glass therewithin, and be provided with means for extracting heat therefrom so as to control the mold temperature. If low viscosity glass were fed into the known slowly rotating refractory lined heated molds or drums of the prior art, they would merely function as a delivery chute since the low viscosity molten glass would not solidify therewithin, but merely flow therethrough.

Although the centrifugal forming of rather large diameter glass cylinders has been suggested in the past, it has been deemed necessary to first conduct the molten glass into a temperature controlled insulated rotating centrifugal drum, and then feed the molten glass from the drum into a nozzle or forming device while rotating the nozzle synchronously with the drum. The glass tube, withdrawn from the nozzle, is in effect preformed in the heated centrifugal drum, and then drawn therefrom in a molten state and pulled through the cooling nozzle wherein it is solidified and set up. This process has not been completely satisfactory due to the fact that it necessitates the utilization of both expensive and bulky apparatus. Further, inasmuch as the rotating drum and nozzle must be of substantially the same diameter for proper feeding, the forming apparatus is virtually limited to the manufacture of a single predetermined diameter tube, since both the forming nozzle and rotating drum must be replaced if a tube of another diameter is to be produced, thus requiring excessive down-time and cumbersome manipulation.

Our invention encompasses an improved method of continuously centrifugally forming large diameter glass cylinders by continuously stream feeding low viscosity glass to a cooled, relatively short rotating mold, solidifying the glass within the mold, and continuously withdrawing a rigidly formed or preset cylinder therefrom. The term "low viscosity glass" as used herein and as known in the art, refers to glasses having a viscosity of below 1000 poises at the time they are fed to the forming device.

It thus has been an object of our invention to provide a simple and inexpensive procedure for forming siliceous or vitreous cylinders of relatively large diameter.

A further object of our invention has been to provide an improved method of stream feeding low viscosity glass directly into a cooled rotating mold to continuously produce glass cylinders having improved homogeneity and uniformity.

Figure 2:
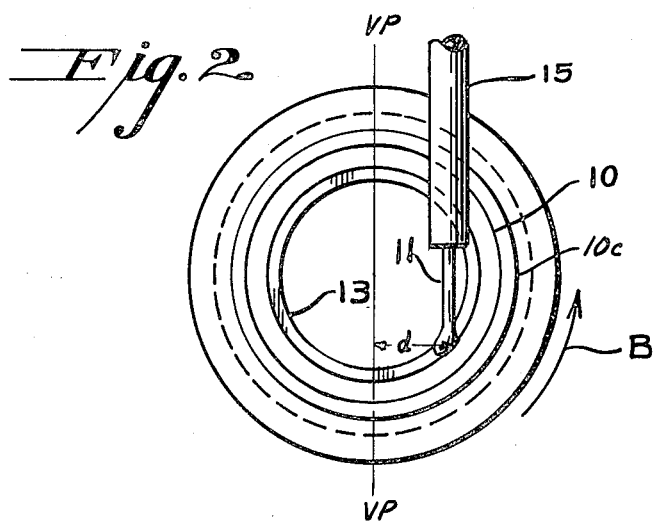

These and other objects of our invention will be more apparent to those skilled in the art from the following disclosure and accompanying drawing in which:

FIGURE 1 is a schematic side elevational view in section illustrating an embodiment of our invention; and FIGURE 2 is an end elevational view disclosing an improved method of feeding the rotating mold.

Referring now to the drawings, and particularly FIGURE 1, a stream of low viscosity glass 11, emanating from an orifice or nozzle 12 connected to any suitable source of the desired glass, is fed into the upper end of an inclined cylindrical mold 10, rotating about its longitudinal axis. The mold 10 may bet rotated by any known expedient such as driven rollers mounted to ride in guide tracks or circumferentially grooved rings positioned about the mold, such as shown schematically at 10b. The mold is also provided with cooling means to maintain the mold at a substantially constant predetermined temperature. Any suitable means may be employed to control the temperature of the revolving mold 10, such as the utilization of a fluid-cooled jacket 10C secured about the mold.

A rigid glass cylinder 13 is continuously withdrawn from the lower end of the revolving mold 10, along the direction of arrow A, by means of a rotating cylinder pulling device such as shown schematically at 14. The pulling device 14, rotated by any suitable means such as driven shaft 14a, abuts the discharge end 10a of the revolving mold 10 at the beginning of the forming operation so as to grip the glass cylinder for withdrawal as it is initially formed. Pull rollers (not shown) may of course supplement the pulling device 14 when it is desired to periodically cut the continuously formed cylinder into a plurality of predetermined lengths. The pulling devices are rotated at the same speed as the mold 10, and, accordingly, as the glass cylinder 13 is centrifugally formed and solidified, it is continuously pulled from the mold while revolving synchronously therewith.

Our concept of stream feeding low viscosity glass into the centrifugally rotating mold to continuously form glass cylinders has to our knowledge, never been contemplated in the past. Through research and experimentation we have found that critical loading conditions exist in stream feeding low viscosity glass into the rotating mold. When the stream feed has a considerable free-fall or extended drop, such as indicated in FIGURE 1, the viscosity of the feed must be maintained below about 500

600 poises, to prevent the entrapment of air and obtain blister-free glass. Therefore, in order to stream feed blister-free glass in the upper end of the low viscosity glass range (between 500 and 1000 poises) we have devised a novel method of loading the rotating mold.

FIGURE 2 illustrates an embodiment of our improved method of feeding blister-free glass to the rotating mold, wherein the stream 11 of low viscosity glass is directed so as to impinge upon an inclined arcuate section or wall portion of the inner surface of the mold 10, which as can be seen from the drawing, is offset with respect to a vertical plane passing through the longitudinal axis of rotation of the mold. The mold 10 is rotated in a direction which is counter-current to the natural flow of the incoming stream feed 11 as it is impinged upon the wall portion, such as shown by arrow B. By loading the rotating mold in this manner, we have been able to produce substantially blister-free glass cylinders even when utilizing a stream feed having a viscosity of between 500 and 1000 poises. We have further found that by reducing the amount of free-fall of the stream 11, such as by the utilization of a delivery nozzle 15 which confines the stream within a passageway to a point just above its discharge to the mold, the formation of blisters is materially inhibited.

Although our invention contemplates the stream feeding of virtually all glasses having a low viscosity of up to about 1000 poises within a practical working range, we have found that an optimum working range exists between 100 and 800 poises. The mold is rotated at a speed sufficient to impart centrifugal force to the low viscosity glass, as it is fed to the mold, and uniformly distribute it about the inner surface of the rotating mold. We have found that the required rate of rotation imparted to the mold varies with the diameter of the cylinder being formed. When forming smaller cylinders having a diameter of about 8 inches, a rotation of about 250 r.p.m. imparted to the mold adequately distributes the stream-fed glass about the inner surface of the mold to form a uniform cylinder. As the size of the cylinder being formed increases, the rotational speed of the mold necessary to impart the desired centrifugal force to the glass decreases. A 14-inch diameter glass cylinder, for example, may be spun and centrifugally formed at a mold rotation of about 150 to 160 r.p.m.

The rate of forming glass cylinders is dependent upon the rate of heat extraction from the glass, and is a function of mold temperature and surface area. The mold temperature should be maintained within a working range of between about 350° C. and 500° C. When the temperature of the mold increases above 500° C. the glass has a tendency to stick to the mold, whereas when the mold temperature decreases below about 350° C. chill wrinkles begin to form in the outer surface of the glass cylinder. Optimum results appear to be obtainable at a mold temperature of about 450° C. The mold is preferably made of a material having high heat conductivity so that heat may be rapidly removed from the molten glass to quickly solidify and completely set up the glass cylinder while in the rotating mold. By properly controlling the flow of cooling fluid through the mold cooling jacket to maintain the desired mold temperature, optimum forming conditions may be achieved.

Since the glass flow rate or forming rate is also proportionate to the area of the internal surface of the rotating mold, the maximum glass flow rate may be increased by increasing the length of the mold, while maintaining the mold temperature constant. However, even with glasses having a long working range, we have found that commercially practical flow rates are obtainable by merely utilizing relatively short length steel molds.

Although our invention is applicable for the continuous formation of large diameter glass cylinders having an outside diameter of between about 8 inches and 48 inches, the following specific example of an embodiment of our invention is merely set forth so that those skilled in the art may clearly understand and readily practice the invention, and is by no means limiting in nature. Borosilicate glass having a composition within the initial or untreated ranges disclosed in U.S. Patent No. 2,221,709 was stream fed at a viscosity of between 400 and 500 poises into an inclined stainless steel mold rotating at approximately 160 r.p.m. about its longitudinal axis. The mold, provided with a cooling jacket to maintain the mold temperature at approximately 450° C., had an internal diameter of 14 inches and a longitudinal length of 9 inches. A flow rate of 610 pounds per hour was maintained for a period of 3.5 minutes to produce a uniform 43-inch glass cylinder which was withdrawn from the mold as it solidified and set up at a rate of 13 inches per minute. Various measurements were taken along the cylinder and it was found that excellent tolerances were achieved, with diameter being maintained within about ±.02 inch and the wall thickness being maintained within a tolerance of about ±.005 inch.

Although we have disclosed the preferred embodiments of our invention, it will be understood that various changes and modifications may be made hereto by those skilled in the art without departing from the spirit and scope of the invention as defined in the following claims.

What is claimed is:

1. An improved method of continuously forming uniform cylindrical bodies of vitreous material which comprises, continuously feeding a stream of molten low viscosity vitreous material downwardly into one end of a rotating cylindrical mold of relatively high-heat conductive material, impinging such stream upon an inner surface which is offset with respect to a vertical plane passing through the longitudinal axis of the rotating cylindrical mold, centrifugally rotating the mold in a direction countercurrent to the downward flow of the offset impinging stream to distribute the low viscosity vitreous material about the inner surface of the rotating mold, removing the heat of fusion from the vitreous material by utilizing the high heat conductivity properties of the cylindrical mold, solidifying the vitreous material while it is contained within the cylindrical mold, and continuously withdrawing a rigid vitreous cylinder from the rotating mold as the cylinder is centrifugally formed and solidified therewithin.

2. A method of continuously forming improved substantially blister-free glass cylinders of relatively large diameter comprising, feeding a stream of molten glass having a viscosity of below 1000 poises into the upper end of an inclined cylindrical rotating mold, reducing the amount of free fall of the stream feed by containing such feed within a confined passageway to a point just above its discharge into the rotating mold, initially impinging such stream upon an arcuate sidewall portion of the inner surface of such mold which is offset with respect to a vertical plane passing through the longitudinal axis of the cylindrical mold, rotating the cylindrical mold about its longitudinal axis in a direction countercurrent to the downward flow of the offset impinging stream at a speed sufficient to impart centrifugal force to the molten glass supplied thereto and uniformly distribute it about the internal surface of the mold, maintaining the cylindrical mold at substantially constant temperature along its longitudinal extent, uniformly extracting heat from the molten glass supplied to the mold to remove the heat of fusion of the glass and rigidly form and set up the glass in a cylindrical shape while within the mold, and continuously extracting the rigidly formed cylindrical shape from the lower end of the mold as it is solidified therein.

3. An improved method of continuously forming substantially blister-free vitreous cylinders of improved uniformity and homogeneity comprising, stream feeding molten vitreous material at a viscosity below 1000 poises into the upper end of an inclined cylindrical mold rotating about its longitudinal axis, directing the stream so as to impinge upon an arcuately inclined side wall portion of the inner surface of the rotating mold which is offset with respect to a vertical plane passing through the longitudinal axis, rotating the cylindrical mold about its longitudinal axis in a direction counter-current to the natural flow of the offset stream impinging upon the side wall portion at a speed sufficient to uniformly distribute the molten material about the inner surface of the mold, solidifying the vitreous material within the mold and continuously extracting a substantially blister-free vitreous cylinder from the mold as it is formed and solidified.

4. An improved method of continuously forming substantially blister-free relatively large diameter cylinders of glass-like material having superior homogeneity and dimensional uniformity comprising the steps of continuously feeding a stream of molten glass-like material having a viscosity of below 1000 poises into the upper end of an inclined cylindrical mold rotating about its longitudinal axis, directing the stream of molten glass-like material so that it initially impinges upon an inclined wall portion of the inner surface of the rotating mold which wall portion is arcuately offset with respect to a vertical plane passing through the axis of rotation, rotating the mold about its longitudinal axis in a direction counter-current to the incoming flow of molten glass-like material so that the wall portion against which the incoming flow impinges is moving upwardly, imparting centrifugal force to the molten glass-like material which has been fed into the mold so as to uniformly distribute it about the inner surface thereof, extracting heat from the molten glass-like material to solidify it in cylindrical form while within the rotating mold, and continuously withdrawing a substantially rigid preset cylinder of glass-like material from the lower end of the cylindrical mold.

References Cited by the Examiner

UNITED STATES PATENTS

| | | | |
|---|---|---|---|
| 1,527,729 | 2/1925 | Dunajeff | 22—65 |
| 1,607,475 | 11/1926 | Otto | 65—302 X |
| 1,637,458 | 8/1927 | Schoonenberg | 65—302 X |
| 1,663,093 | 3/1928 | Peiler | 65—302 X |
| 2,133,662 | 10/1938 | Gray | 65—86 |
| 2,778,162 | 1/1957 | Giffen | 65—71 |

FOREIGN PATENTS 766,220    1/1957    Great Britain.

DONALL H. SYLVESTER, *Primary Examiner*.